United States Patent
Chaterji et al.

(10) Patent No.: US 12,469,288 B2
(45) Date of Patent: Nov. 11, 2025

(54) SYSTEM FOR CONTENT AWARE RECONFIGURATION OF VIDEO OBJECT DETECTION

(71) Applicant: Purdue Research Foundation, West Lafayette, IN (US)

(72) Inventors: Somali Chaterji, West Lafayette, IN (US); Saurabh Bagchi, West Lafayette, IN (US); Ran Xu, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 459 days.

(21) Appl. No.: 18/120,285

(22) Filed: Mar. 10, 2023

(65) Prior Publication Data

US 2023/0290145 A1 Sep. 14, 2023

Related U.S. Application Data

(60) Provisional application No. 63/318,433, filed on Mar. 10, 2022.

(51) Int. Cl.
*G06V 20/40* (2022.01)
*G06T 7/20* (2017.01)

(52) U.S. Cl.
CPC ............ *G06V 20/46* (2022.01); *G06T 7/20* (2013.01)

(58) Field of Classification Search
None
See application file for complete search history.

(56) References Cited

PUBLICATIONS

Ran Xu, Chen-lin Zhang, Pengcheng Wang, Jayoung Lee, Subrata Mitra, Somali Chaterji, Yin Li, & Saurabh Bagchi. (2020). ApproxDet: Content and Contention-Aware Approximate Object Detection for Mobiles.*
Bel, O., Mukhopadhyay, S., Tallent, N., Nawab, F., & Long, D. (2021). WinnowML: Stable feature selection for maximizing prediction accuracy of time-based system modeling. In 2021 IEEE International Conference on Big Data (Big Data) (pp. 3031-3041).*
Hussein, N., Bejnordi, B., & Jain, M. (2020). VideoEpitoma: Efficient Recognition of Long-range Actions.*
(Continued)

*Primary Examiner* — Andrew W Bee
*Assistant Examiner* — Christine Zhao
(74) *Attorney, Agent, or Firm* — Purdue Research Foundation

(57) ABSTRACT

A system may receive video information. The system may select a combination of light-weight features and heavy weight features. The light-weight features may be extracted from the video information and the heavy weight features not extracted. The system may forecast, based on the light-weight features and the heavy weight features, accuracy, and latency metrics for performing the object detection and tracking using a plurality of candidate branch configurations, respectively. The system may select a branch configuration from the plurality of candidate branch configurations in response to satisfaction of an optimization criterion. The system may perform object detection and tracking based on the selected branch configuration.

20 Claims, 4 Drawing Sheets

(56) References Cited

PUBLICATIONS

Anjomshoaa, A. et al., City scanner: Building and Scheduling a Mobile Sensing Platform for Smart City Services. IEEE Internet of Things Journal, vol. 5, No. 6, Dec. 2018, pp. 4567-4579, (2018); date of publication May 21, 2018.

Babenko, B. et al., Visual Tracking with Online Multiple Instance Learning. In Proceedings of the IEEE Conference on Computer Vision and Pattern Recognition (CVPR), IEEE, pp. 983-990, (2009).

Chin, T.-W. et al., AdaScale: Towards Real-time Video Object Detection Using Adaptive Scaling. In Proceedings of the 2nd Systems and Machine Learning Conference (SysML), Palo Alto, CA, USA, (2019).

Fang, B. et al., FlexDNN: Input-Adaptive On-Device Deep Learning for Efficient Mobile Vision. In Proceedings of the 2020 5th IEEE/ACM Symposium on Edge Computing (SEC), IEEE, pp. 84-95, (2020).

Fang, B. et al., NestDNN: Resource-Aware Multi-tenant On-Device Deep Learning for Continuous Mobile Vision. In Proceedings of the 24th Annual International Conference on Mobile Computing and Networking (MobiCom '18), Oct. 29-Nov. 2, 2018, New Delhi, India, pp. 115-127, (2018).

Feichtenhofer, C. et al., Detect to track and track to detect. In Proceedings of the 2017 IEEE International Conference on Computer Vision (ICCV), pp. 3057-3065, (2017).

Grabner, H. et al., Real-time tracking via On-line boosting. In Proceedings of the 2006 1st British Machine Vision Conference (BMVC 2006), vol. 1, pp. 47-56, Edinburgh, United Kingdom, Sep. 4-7, 2006, (2006).

Hadary, O. et al., Protean: VM allocation service at scale. In 14th USENIX Symposium on Operating Systems Design and Implementation (OSDI 20), Nov. 4-6, 2020, pp. 845-861, (2020).

Han, K. et al., GhostNet: More features from cheap operations. In Proceedings of the 2020 IEEE/CVF Conference on Computer Vision and Pattern Recognition (CVPR), pp. 1577-1586, (2020).

He, K. et al., Deep Residual Learning for Image Recognition. In Proceedings of the 2016 IEEE conference on Computer Vision and Pattern Recognition (CVPR), pp. 770-778, (2016).

Hieu, N. et al., Virtual Machine Consolidation with Usage Prediction for Energy-Efficient Cloud Data Centers. In 2015 IEEE 8th International Conference on Cloud Computing. IEEE, pp. 750-757, (2015).

Howard, A. et al., Searching for MobileNetV3. In Proceedings of the 2019 IEEE/CVF International Conference on Computer Vision (ICCV). pp. 1314-1324, (2019).

Hu, H. et al., Network Trimming: A Data-Driven Neuron Pruning Approach Towards Efficient Deep Architectures. arXiv preprint arXiv:1607.03250 (2016).

Jiang, A. H et al., Mainstream: Dynamic Stem-Sharing for Multi-Tenant Video Processing. In Proceedings of the 2018 USENIX Annual Technical Conference (USENIX ATC '18), Jul. 11-13, 2018, Boston, MA, USA, pp. 29-42, (2018).

Jiang, J. et al., Chameleon: Scalable Adaptation of Video Analytics. In Proceedings of the 2018 Conference of the ACM Special Interest Group on Data Communication (SIGCOMM '18), Budapest, Hungary, pp. 253-266, (2018).

Joshi, K. A. et al., A Survey on Moving Object Detection and Tracking in Video Surveillance System. International Journal of Soft Computing and Engineering (IJSCE), vol. 2, Issue 3, Jul. 2012, pp. 44-48, (2012).

Kalal, Z. et al., Forward-Backward Error: Automatic Detection of Tracking Failures. In Proceedings of the 2010 20th International Conference on Pattern Recognition (ICPR), IEEE, pp. 2756-2759, (2010).

Klimovic, A. et al., Pocket: Elastic Ephemeral Storage for Serverless Analytics. In Proceedings of the 13th USENIX Symposium on Operating Systems Design and Implementation (OSDI '18), Oct. 8-10, 2018, Carlsbad, CA, USA, pp. 427-444, (2018).

Lee, J. et al., Context-Aware Application Scheduling in Mobile Systems: What Will Users Do and Not Do Next? In Proceedings of the 2016 ACM International Joint Conference on Pervasive and Ubiquitous Computing (UBICOMP '16), Sep. 12-16, 2016, Heidelberg, Germany, pp. 1235-1246, (2016).

Li, X. et al., Target-Aware Deep Tracking. In Proceedings of the 2019 IEEE/CVF Conference on Computer Vision and Pattern Recognition (CVPR), pp. 1369-1378, (2019).

Lin, J. et al., MCUNet: Tiny Deep Learning on IoT Devices. In Proceedings of the 34th Conference on Neural Information Processing Systems (NeurIPS 2020), Vancouver, Canada, 12 pgs., (2020).

Liu, L. et al., Edge Assisted Real-Time Object Detection for Mobile Augmented Reality. In the Proceedings of The 25th Annual International Conference on Mobile Computing and Networking (MobiCom '19), Los Cabos, Mexico, Oct. 21-25, 2019, 16 pgs., (2019).

Liu, M. et al., Mobile Video Object Detection with Temporally-Aware Feature Maps. In the Proceedings of the 2018 IEEE/CVF Conference on Computer Vision and Pattern Recognition (CVPR), pp. 5686-5695, (2018).

Mahgoub, A. et al., OptimusCloud: Heterogeneous Configuration Optimization for Distributed Databases in the Cloud. In the Proceedings of the 2020 USENIX Annual Technical Conference (USENIX ATC), Jul. 15-17, 2020, pp. 189-203, (2020).

Mahgoub, A., et al., Sonic: Application-aware Data Passing for Chained Serverless Applications. In the Proceedings of the 2021 USENIX Annual Technical Conference (USENIX ATC), Jul. 14-16, 2021, pp. 285-301, (2021).

Mahgoub, A. et al., Sophia: Online Reconfiguration of Clustered NoSQL Databases for Time-Varying Workloads. In the Proceedings of the 2019 USENIX Annual Technical Conference (USENIX ATC), Jul. 10-12, 2019, Renton, WA, USA, pp. 223-240, (2019).

Ran, X. et al., DeepDecision: A Mobile Deep Learning Framework for Edge Video Analytics. In the Proceedings of the IEEE Infocom 2018—IEEE Conference on Computer Communications, pp. 1421-1429, (2018).

Redmon, J. et al., You Only Look Once: Unified, Real-Time Object Detection. In the Proceedings of the 2016 IEEE Conference on Computer Vision and Pattern Recognition (CVPR), pp. 779-788, (2016).

Ren, S. et al., Faster R-CNN: Towards Real-Time Object Detection with Region Proposal Networks. IEEE Transactions on Pattern Analysis and Machine Intelligence (TPAMI), vol. 39, No. 6, Jun. 2017, pp. 1137-1149; date of publication Jun. 5, 2016.

Singh, R. et al., 2013. Yank: Enabling Green Data Centers to Pull the Plug. Presented as part of the 10th USENIX Symposium on Networked Systems Design and Implementation (NSDI '13), pp. 143-155, (2013).

Tan, M. et al., MnasNet: Platform-Aware Neural Architecture Search for Mobile. In the Proceedings of the 2019 IEEE/CVF Conference on Computer Vision and Pattern Recognition (CVPR), pp. 2815-2823, (2019).

Tan, M. et al., EfficientNet: Rethinking Model Scaling for Convolutional Neural Networks. In the Proceedings of the 36th International Conference on Machine Learning, Long Beach, CA, USA, Jun. 9-15, 2019, PMLR, vol. 97, 11 pgs., (2019); preprint for ICML 2019 available at arXiv:1905.11946v2 [cs.LG] Jun. 10, 2019.

Tan, M. et al., Efficientdet: Scalable and efficient object detection. In Proceedings of the 2020 IEEE/CVF conference on computer vision and pattern recognition, pp. 10781-1079, (2020); arXiv:1911.09070v7 [cs.CV] Jul. 27, 2020.

Teerapittayanon, S. et al., BranchyNet: Fast Inference via Early Exiting from Deep Neural Networks. In Proceedings of the 2016 23rd International Conference on Pattern Recognition (ICPR), Cancún, Mexico, Dec. 4-8, 2016, IEEE, 2464-2469, (2016).

Wang, S. et al., Fully Motion-Aware Network for Video Object Detection. In Part XIII of the Proceedings of the 15th European Conference on Computer Vision (ECCV), Munich, Germany, Sep. 8-14, 2018, pp. 542-557; V. Ferrari et al. (Eds.): ECCV 2018, LNCS 11217, (2018).

Wojke, N. et al., Simple Online and Realtime Tracking with a Deep Association Metric. In 2017 IEEE International Conference on Image Processing (ICIP 2017). IEEE, pp. 3645-3649, (2017).

(56) References Cited

PUBLICATIONS

Wu, B. et al., FBNet: Hardware-Aware Efficient ConvNet Design via Differentiable Neural Architecture Search. In Proceedings of the 2019 IEEE/CVF Conference on Computer Vision and Pattern Recognition (CVPR), pp. 10726-10734, (2019).

Xu, R. et al., ApproxNet: Content and Contention-Aware Video Object Classification System for Embedded Clients. ACM Transactions on Sensor Networks (TOSN), vol. 18, No. 1, Article 11, pp. 1-27, (2021); publication date Sep. 2021.

Xu, R. et al., ApproxDet: Content and Contention-Aware Approximate Object Detection for Mobiles. In Proceedings of the 18th ACM Conference on Embedded Networked Sensor Systems (SenSys '20), Nov. 16-19, 2020, Virtual Event, Japan (ACM New York, NY USA), pp. 449-462, (2020).

Yu, S. et al., Computation Offloading with Data Caching Enhancement for Mobile Edge Computing. IEEE Transactions on Vehicular Technology, vol. 67, No. 11, Nov. 2018, pp. 11098-11112, (2018).

Zhang, H. et al., Live Video Analytics at Scale with Approximation and Delay-Tolerance. In the Proceedings of the 14th USENIX Symposium on Networked Systems Design and Implementation (NSDI '17), Mar. 27-29, 2017, Boston, MA, USA, pp. 377-392, (2017).

Zhang, X. et al., Shufflenet: An Extremely Efficient Convolutional Neural Network for Mobile Devices. In Proceedings of the 2018 IEEE/CVF Conference on Computer Vision and Pattern Recognition, pp. 6848-6856, (2018).

Zhu, X. et al., Flow-Guided Feature Aggregation for Video Object Detection. In Proceedings of the 2017 IEEE International Conference on Computer Vision, pp. 408-417, (2017).

Zhu, X. et al., Deep Feature Flow for Video Recognition. In Proceedings of the 2017 IEEE Conference on Computer Vision and Pattern Recognition, pp. 4141-4150, (2017).

Redmon, J. et al., YOLOv3: An Incremental Improvement. arXiv preprint, arXiv:1804.02767v1 Apr. 8, 2018, 6 pgs. (2018).

Shuai, H. et al., Cascaded Regional Spatio-Temporal Feature Networks for Video Object Detection. IEEE Access—Special Section on Sequential Data Modeling and its Emerging Applications, vol. 6, 2018, pp. 3096-3106; date of publication Dec. 27, 2017.

\* cited by examiner

SYSTEM FOR CONTENT AWARE RECONFIGURATION OF VIDEO OBJECT DETECTION

CROSS REFERENCE TO RELATED APPLICATIONS

This application claims the benefit of U.S. Provisional Application No. 63/318,433 filed Mar. 10, 2022, the entirety of which is herein incorporated by reference.

GOVERNMENT RIGHTS

This invention was made with government support under CCF1919197, CNS-2038986, CNS-2038566, and CNS-2146449 awarded by the National Science Foundation and under 2021-67021-34251 awarded by the United States Department of Agriculture. The government has certain rights in the invention.

TECHNICAL FIELD

This disclosure relates to computer vision and, in particular, to object detection and tracking.

BACKGROUND

As a key problem in computer vision, object detection seeks to locate object instances in an image or video frame, using bounding boxes, and simultaneously classify each instance into pre-defined categories. Convolutional neural networks (CNNs) are popular, and can be separated into two parts: a backbone network, which extracts features from images, and a detection network, which classifies object regions based on the extracted features. The detection network can be further categorized into two-stage or single-stage models.

While single-image object detectors can be applied to videos frame-by-frame, this method ignores the reality that adjacent frames have redundancies. This temporal continuity in videos can be leveraged to approximate the computations, or to enhance detection in neighboring frames. Many previous approaches optimize for accuracy, explore temporal aggregation of object features, using either recurrent neural networks, or motion analysis. More practical solutions integrate object detection with visual tracking, where inexpensive trackers connect costly object detection outputs. Recent papers generally improve 1-2% mAP in accuracy.

Videos come with inherent information within a series of contiguous frames. For example, the scale of objects, the moving speed, the complexity, etc. Therefore, some video object detection models utilize the content information in videos, to improve latency and accuracy. Such models are herein referred to as content-aware video object detection systems. At model inference time, a content-aware system reconfigures itself based on the content information from the video stream. Instead, a content-agnostic system uses a static model variant or branch.

Video object detection algorithms have good accuracy and latency on server-class machines. However, existing approaches suffer when running on edge or mobile devices, particularly under a tight latency service level objective (SLO) and under varying resource contention. There has been significant work on developing continuous vision applications on mobile or resource-constrained devices—some with manual-crafted network architectures and some with models given by neural architecture search.

To further optimize the efficiency, additional techniques have been applied to provide adaptation to the deep models. Examples include, tuning the size of the input or other model parameters at inference time, prune a static DNN into multiple DNNs that could be dynamically selected, or select a different exit within a network.

These adaptive video object detection frameworks usually feature multi-models or multi-branches as part of their design. However, in real applications, considering the changing video content and available computational resources, the requirement for switching between execution kernels may be frequent, with a concomitant switching overhead. The uncertainty of performance after the switching makes it hard for the system to maintain consistent latency and accuracy performance at runtime.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
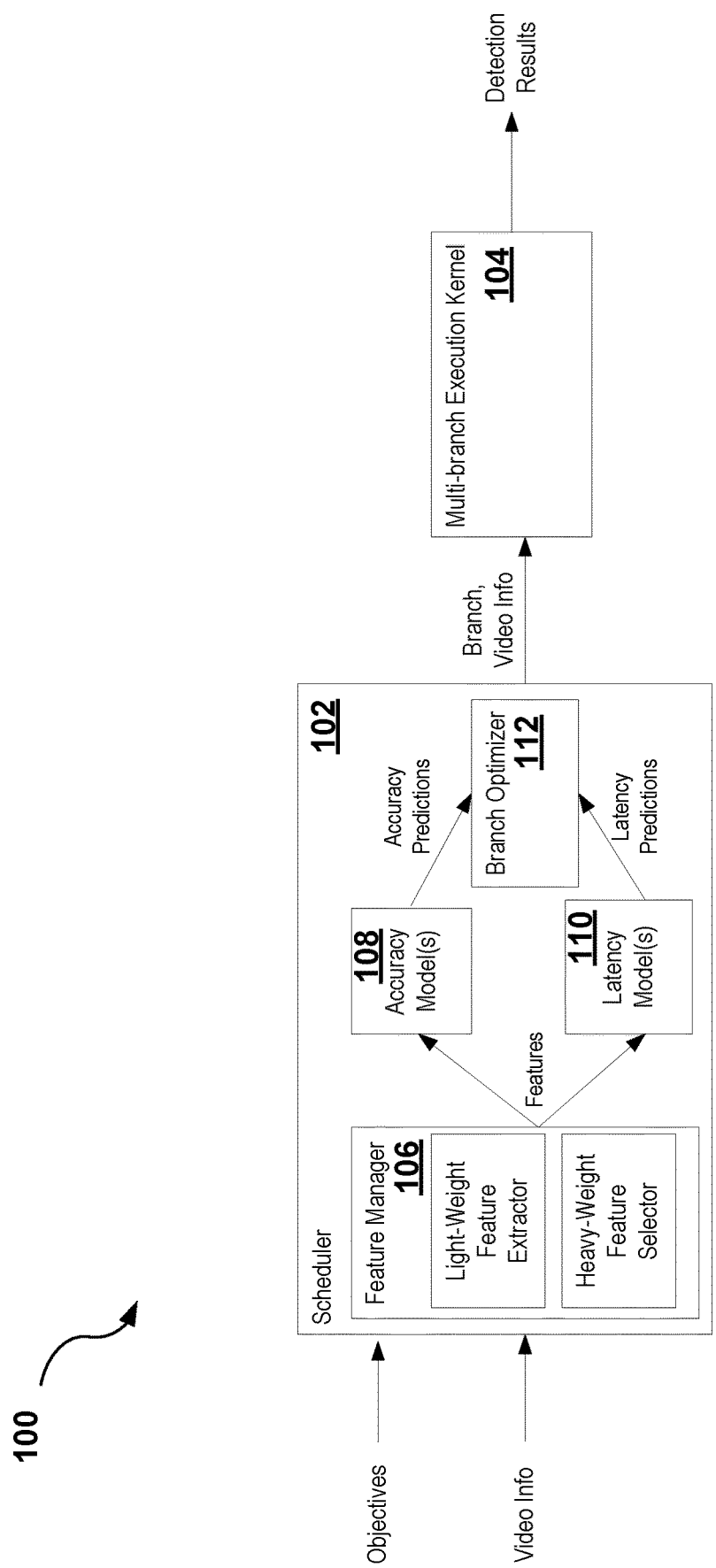
FIG. 1 illustrates an example of a system 100 for cost and content aware reconfiguration of computer vision.

Video object detection on mobiles has attracted considerable attention in recent years. An adaptive vision system consists of two key components: (1) a multi-branch execution kernel (MBEK), with multiple execution branch configurations each achieving an operating point in the accuracy-latency axes, and (2) a scheduler that decides which branch configuration to use, based on video features and the user's latency objectives. Much progress has been made in developing light-weight models and systems that are capable of running on mobile devices with moderate computation capabilities.

Previous work focuses on statically optimized models and systems, pushing the frontiers of accuracy and efficiency. More recently, adaptive object detection models and systems have emerged. These are capable of achieving different points in the accuracy-latency tradeoff space, and are thus suited to mobile devices under real-world conditions: adapting to dynamically changing content, resource availability on the device, and user's latency objectives.

Despite recent advances, present approaches to video object detection fail to adequately consider the contending pulls of the accuracy-latency frontier of the adaptive multi-branch execution kernel (MBEK) vision system, on the one hand, and the latency cost of the scheduler itself, on the other. Previous work faces two fundamental challenges.

An efficient object detection system that is capable of reconfiguration at runtime faces two challenges: (1) Lack of content-rich features and fine-grained accuracy prediction. Insufficient feature extraction and inaccurate prediction before the reconfiguration can worsen performance. (2) Lack of cost-aware design. The system reconfiguration overhead (cost) is not considered when a decision is made. This may degrade overall performance if the reconfiguration cost is high.

Present system fall short of these challenges for a variety of reasons. For example, the scheduler relies on computationally light video features (e.g., height, width, number of objects, or intermediate results of the execution kernel), to decide which branch to run. Such features might not be sufficiently informative. Other features or models, such as motion and appearance features of the video, can improve decision making, but are typically too heavy-weight. For example, extracting a high-dimensional Histogram of Oriented Gradient (HOG) and executing the associated models (i.e., other modules of the scheduler that select the execution branch configuration) takes 30.25 ms (Table 1) on the Jetson TX2, nearly the time of one video frame.

If the conditions change frequently, the scheduler incurs high switching overhead between execution branch configurations. Thus, a cost-aware scheduler should tamp down the frequency of reconfigurations based on the cost, which itself can vary depending on the execution branch configuration. Prior work has not considered a cost-aware design of the scheduler and, as we show empirically, this leads to sub-optimal performance.

To address these and other challenges, a system and methods for cost and content aware reconfiguration of video object detection systems is provided. The system described herein may interchangeably be referred to as the system.

A first example of a technical advancement is a cost-benefit analyzer that enables low-cost online reconfiguration. This design reduces scheduler cost and increases accuracy, since more of the latency budget can be devoted to the object detection kernel.

Another example of a technical advancement is a content-aware accuracy prediction model of the execution branch, so that the scheduler selects a branch tailored to the video content. Such a model is built on computationally-heavy features and integrates well with our cost-benefit analysis.

A third example of a technical advancement is experimentally proven performance enhancements over previous approaches. Extensive experimental evaluation was conducted on GPU boards and against a set of previous approaches. The system, as described herein, revealed important insits—(i) it is important to consider the effect of contention from co-located applications, and (ii) it is important to engineer which features to use for making the selection of the execution branch; this is especially essential for the incorporation of content-aware features, which also have a high computational overhead. The full implementation of the system is able to satisfy even stringent latency objectives, 30 fps on the weaker TX2 board, and 50 fps on the higher performing AGX Xavier board. Additional technical advancements are made evident by the system and methods described herein.

FIG. 1 illustrates an example of a system 100 for cost and content aware reconfiguration of computer vision. The system 100 may include a scheduler 102.

The scheduler may determine which branch configuration of a multibranch execution kernel (MBEK) 104 to utilize. The MBEK 104 may include a multi-branch continuous vision algorithm that consumes streaming video frames as inputs. The system 100 may include the MBEK, or, depending on the implementation, the system may execute on top of an MBEK, where the MBEK is part of a sperate system.

An Execution Branch configuration is a distinct setting of an algorithm, typically differentiated by controlling some hyperparameters (colloquially, "knobs"), so as to finish the vision task in a distinct and fixed execution time (latency) and a consistent accuracy across a dataset. Models with multiple execution branch configurations are often considered by adaptive object detection frameworks. Some MBEK may include an object tracker paired with an object detector to greatly reduce the latency while preserving the accuracy. An execution branch configuration might, for example, specify the choice of object detector and/or object tracker, the input shapes of video frames fed into them, the number of frames in a GoF that runs the object detector (always on the first frame of the GoF) and the object tracker (on the remaining frames of the GoF), and the number of region proposals in the object detector. As described herein, execution branch configuration, branch configuration, execution branch, and branch are used interchangeably.

The trade-off between accuracy and latency is fundamental to adaptive vision systems. If a higher accuracy is desired, one has to incur higher latency. Each execution branch configuration has an associated accuracy and latency for a given content type and contention level. The scheduler may determine an execution branch configuration on-the-fly, so as to achieve the optimal reachable accuracy latency point.

The scheduler 102 may, among other aspects described herein, perform cost benefit analysis of both feature selection and branch configuration selection. The scheduler 102 may include a feature manager 106 which models the cost and the benefit of all possible features used by the scheduler 102 to decide among the execution branch configuration. For example, the feature manager 106 may perform cost-benefit analysis to choose a set of features (eq 1 below). The scheduler 102 may include (or access) an accuracy model 108 and a latency model 110 and to determine performance metrics including accuracy and latency metrics. The accuracy model 108 and latency model 110, which are described in detail below, may include machine learning models trained to associate performance metrics with execution branches and features. The scheduler 102 may predict accuracy and latency of execution branches based on these selected features.

The scheduler may include a branch optimizer 112 which may select the optimal branch based on the accuracy and latency metrics. For example, the branch optimizer 112 may solve a constrained optimization problem (eq 4) that accounts for switching cost and maximizes the benefit (the improvement of accuracy) of the MBEK 104, such that the latency stays below the SLO.

Figure 2:
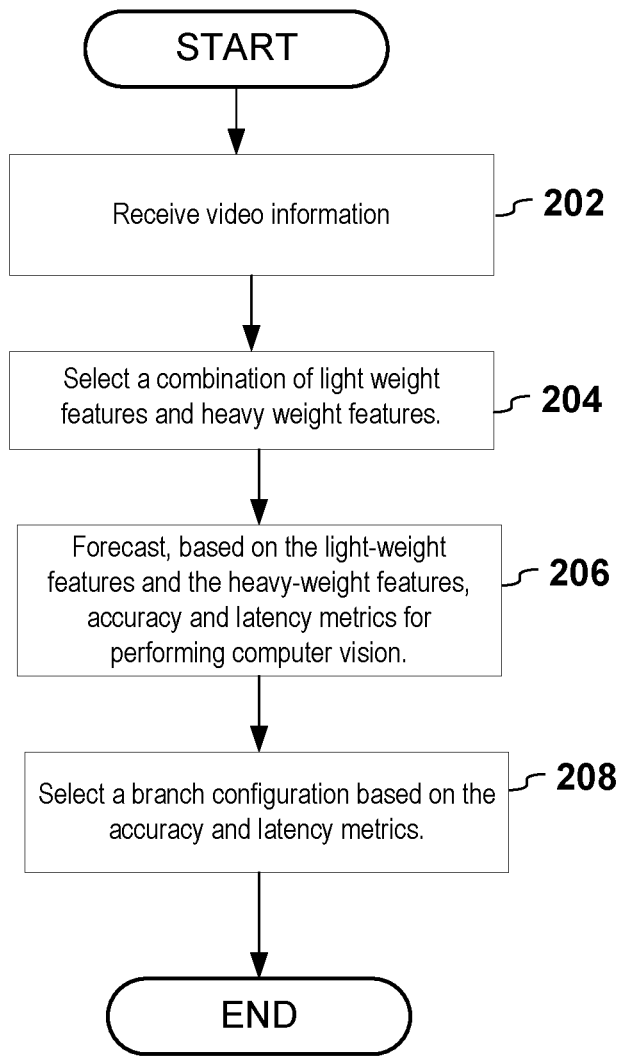
FIG. 2 illustrates example logic for the system.

FIG. 2 illustrates example logic for the system. The scheduler may receive video information (202). The video information may include a video stream, a video frame, or a group of frames. In some examples, the scheduler may select a group of frames over a sample window. Alternatively or in addition, the video information may include various metadata or embedded data.

Features may be extracted from the video information. It is observed that features f can be divided into at least two types: light-weight features $f_L$, such as height and width of the input video or the number of objects in the frame and are thus available to the scheduler for "free", and heavy-weight features $f_H$, which, as is described below, may be extracted based on the cost-benefit performance criterion.

Light-weight vs. Heavy-weight Features: The light-weight features $f_L$ can be extracted without adding cost and its corresponding content-agnostic accuracy prediction is also computationally light-weight (e.g., the dimension of the image). Heavy-weight features $f_H$ are content dependent and need processing of the video frame, including costly neural network-based processing (e.g., MobileNetV2 feature of a video frame). As is well known in the literature, accuracy is enhanced with content-dependent features, such as HoC, HOG, MobileNet, and ResNet. We show empirically that this improvement happens under many scenarios, but not all. Furthermore, one has to account for the decrease in the latency budget of the execution kernel due to the overhead of the features themselves. This is the key idea behind our feature selection algorithm, which maximizes the accuracy of the selected branch in the execution kernel, with overhead considered.

Table 1 shows that HoC, HOG, and MobileNetV2 features take 14.14 ms, 25.32 ms, and 153.96 ms respectively, and the corresponding prediction models on these features take 4.94 ms, 4.93 ms, and 9.33 ms respectively. This is because these features are high-dimensional to encode. Such costs can be overwhelming especially when the continuous vision system is running under a strict latency budget, say 33.3 ms (30 fps). Supposing the scheduler is triggered at every first frame of a GoF of size 8 (a middle-of-the-range number), the MobileNetV2 feature extraction plus prediction take 61% of the latency budget. In several situations, this offsets its benefit in selecting a better execution branch through its content-aware accuracy prediction model.

possible features F, consisting of light-weight features $f_L$ and a set of heavy-weight feature candidates $F_H$. Our algorithm will always use the light-weight features $f_L$ and then determine which subset of heavy-weight features $F_H \in 2^{F_H}$ to use. It is possible that $f_H = \emptyset$. We first extract the light-weight features and run the latency prediction model $L_0(b, f_L)$ and accuracy prediction model $A(b, f_L)$.

Then, we use the following nested optimization to decide $f_H$, one element at a time, $f_H^i$. Let us say at any point in the iterative process, the currently selected set of heavy-weight features is $f_H^s$. The optimization is given by $$f_H^i = \operatorname*{argmax}_{f_H \in \mathcal{F}_H \setminus f_H^s} \max_{b \in \mathcal{B}} A(b, f_L) + Ben(f_H^s \cup f_H) \quad (1)$$

$$\text{s.t. } L_0(b, f_L) + S(f_L) + S(f_H^s \cup f_H) + C_{b_0}(b) + M(b) \leq L_0.$$

$Ben(f_H^s \cup f_H)$ is the benefit (improvement in accuracy) of including additional features $f_H$. $S(f_L)$ is the cost to extract

TABLE 1

List of features and their costs.

| Category, Notations | Feature names, Dimension | Execution time (or cost, in ms) | | Description |
|---|---|---|---|---|
| | | Extract | Predict | |
| Light-weight, $f_L$ | Light, 4 | 0.12 | 3.71 | Composed of height, width, number of objects, averaged size of the objects. |
| Heavy-weight, $f_H^1$ | HoC, 768 | 14.14 | 4.94 | Histogram of Color on red, green, blue channels. |
| Heavy-weight, $f_H^2$ | HOG, 5400 | 25.32 | 4.93 | Histogram of Oriented Gradients. |
| Heavy-weight, $f_H^3$ | Resnet50, 1024 | 26.96 | 6.07 | ResNet50 feature from the object detector in the MBEK, average pooled over height and width dimensions and only reserving the channel dimension |
| Heavy-weight, $f_H^4$ | CPoP, 31 | 3.62 | 4.84 | Class Predictions on Proposal feature from the Faster R-CNN detector in the MBEK. Prediction logits on the region proposals are extracted and average pooled over all region proposals. We only reserve the class dimension (including a background class) |
| Heavy-weight, $f_H^5$ | MobileNet V2, 1280 | 153.96 | 9.33 | Efficient and effective feature extractor, average pooled from the feature map before the fully-connected layer. |

The scheduler may select a combination of light-weight features and heavy weight features (204). The light-weight features may be extracted from the video information. The heavy-weight features may not yet be extracted. A key challenge is that feature selection according to the system and methods described herein, should work without actually extracting the heavy-weight features or querying the corresponding models for scheduling purposes. To address this challenge, we take some pragmatic simplifications.

The scheduler may select heavy weight features from candidate heavy weight features where an accuracy contribution of including the heavy weight features with the light-weight features is maximized and a latency contribution of extracting the heavy weight features satisfies a latency constraint. By way of example, let the set of all and use light features $f_L$; $S(f_H^s \cup f_H)$ is the cost for heavy features $f_H \cup f_H$; $C(b_0, b)$ is the switching cost from the current branch $b_0$ to the new branch b.

We further simplify the calculation of the benefit Ben $(f_H^s \cup f_H)$ due to the heavy features in Equation 1. Concretely, this benefit depends on the content features and should ideally be calculated by extracting the heavy features from the current video frame. However, doing so would be costly and would defeat the purpose of this feature selection algorithm.

In important point worth consideration here is that we use $A(b, f_L) + Ben(f_H^s \cup f_H)$ as a proxy of $A(b, f_H^s \cup f_H)$ to avoid extracting heavy features and executing the corresponding content-aware accuracy prediction model. The benefit function $Ben(f_H^s \cup f_H)$ is collected from the offline dataset to reflect the accuracy improvement of the system with the heavy features F against the light feature $f_L$. To further reduce the online cost, these may be implemented using lookup tables.

Accordingly, the scheduler may determine, based on the light-weight features $f_L$ and a candidate branch configuration, a base accuracy value using a machine learning model (i.e. an accuracy model $A(b, f_L)$). The scheduler may access mappings between the candidate heavy weight features and a plurality of modeled performance values, the performances values including modeled accuracy values. The mapping may be stored as a table or as a trained machine learning model. The schedular may select the heavy weight features where a combination of the base accuracy values and corresponding modeled accuracy values is maximized.

The scheduler may forecast, based on the light-weight features and the heavy-weight features, accuracy and latency metrics for computer vision (206). The scheduler may predict the metrics using a plurality of candidate branch configurations.

The forecasting may include calculating performance metrics (i.e. latency and accuracy metrics) using various models. For example, the schedular may calculate, with an accuracy model, the accuracy metrics based on the light-weight features, the heavy weight features, and the plurality of candidate branch configurations. The scheduler may calculate, with a latency model, the latency metrics based on the light-weight features, the heavy weight features, and the plurality of candidate branch configurations.

The latency model and accuracy model may each be machine learning models trained with features and branch configurations to provide an estimate of latency and accuracy, respectively. The scheduler strives to pick an execution branch that maximizes the accuracy of object detection, while probabilistically meeting a latency objective. The latency objective is typically specified in terms of tail latency, like the 95th percentile latency, and this does not intrinsically affect the algorithms in the system. Specifically, a latency prediction model $L(b, f)$ and an accuracy prediction model $A(b, f)$ predict the latency (i.e., cost) and accuracy (i.e., benefit) of the execution branch b, based on a set of features f, in a short look-ahead window, called Group-of-Frames (GoF). The choice of the optimal branch is thus determined by the solution to a constrained optimization problem that maximizes the predicted accuracy while maintaining the predicted latency within the latency SLO $L_0$, given by $$b^* = \underset{b \in \mathcal{B}}{\mathrm{argmax}}\ A(b, f) \quad (2)$$

s.t. $L(b, f) \leq L_0$.

given $f \in \mathcal{F}$.

A critical insight of our latency and accuracy prediction model is that these models are not only a function of the execution branch b, but also of the content-based features, which can be included in f. This insight thus allows us to choose different features f from a set of features F with varying computational cost at runtime, such that our scheduler can be better adapted to the video content characteristics and the computing resources available.

Instead of predicting the accuracy of an execution branch b on a representative large dataset we aim at predicting the accuracy of an execution branch b at a finer granularity, using a video snippet. A video snippet is a sequence of N consecutive frames, starting at any point of the streaming video. In practice, since the scheduler makes a decision right on the current frame, we extract features from the first frame of the snippet and use these features to predict the accuracy of execution branches on the video snippet. Concretely, $A(b, f)$ predicts the accuracy of branch b in a short look-ahead window using input features f, where the features can include light-weight ($f_L$) with a subset of the heavy-weight features ($f_H$).

The accuracy prediction model $A(b, f)$ is realized with a 6-layer neural network. The first layer uses fully-connected projections to project the low-dimensional light-weight features and high-dimensional content features to the same dimension, and then concatenates them. All rest layers are fully connected with ReLU as the activation function.

A key observation which provides a technical advancement of the system described herein is that more expressive and computationally heavy features ($f_H$) can significantly improve the prediction. For example, we find that the widely used computer vision features, like Histogram of Colors (HoC), Histogram of Oriented Gradient (HOG), recent neural network based features, like MobileNetV2 (details in Table 1), can provide significantly better-accuracy prediction. We call the model using such heavy-weight content features a content-aware accuracy model. In addition to the three external feature extractors, we also use two features from the Faster R-CNN detector in the MBEK—ResNet50 and Class Predictions on Proposal (CPoP) feature. They are less computationally costly to collect as these are obtained directly from the object detector component of the MBEK, as opposed to other features extracted on-the-fly (HoC, HOG, and MobileNetV2), and they turn out to be informative features to characterize the accuracy of each branch in the MBEK.

The scheduler may access a latency model which provide estimates of sources of latency in the system including, for example, an end-to-end latency. In some examples, the end-to-end latency may include the latency of the MBEK and the execution time overhead of the system's scheduler. The latter may include at least three parts—(1) the cost of extracting various features, (e.g., the number and sizes of objects in the video frame, the histogram of colors, the degree of motion from one frame to another), (2) the cost of executing corresponding models to predict the accuracy and the latency of each execution branch using these feature values, and (3) the switching cost from the current execution branch to a new one.

The following equation represents a latency model that has four terms, given by:

$$L(b, f) = L_0(b, f_L) = S_0 = S(f_H) = C(b_0, b), \quad (3)$$

where $L_0(b, f_L)$ is a linear regression model defined on each branch b using the light-weight features $f_L$ to predict the latency of b. $S_0$ is the cost of the scheduler that extracts and uses the light-weight features $f_L$ to determine the optimal branches; $S(f_H)$ is the additional cost of the scheduler that extracts and uses computationally heavy content features $f_H$; $C(b_0, b)$ is the switching cost from the current branch $b_0$ to the new branch b. For ease of exposition, in this formulation, we have considered all the heavy-weight features as one unit—in reality, the scheduler can recruit any subset of heavy-weight features.

The scheduler may select a branch configuration based on the accuracy and latency metrics. The scheduler may select the branch configuration from a plurality of candidate branch configurations in response to satisfaction of an optimization criterion. The optimization criterion is shown for example, in Equation 4 below.

Given the optimization problem in Equation 4 and the latency model in Equation 3, the branch controller is tasked to select the optimal execution branch b* based on the selected features f under the latency budget $L_0$, by solving the following constrained optimization problem:

$$b^* = \underset{b \in \mathcal{B}}{\operatorname{argmax}} A(b, f) \quad (4)$$

$$\text{s.t. } L_0(b, f_L) + S_0 + S(f_H) + C(b_0, b) \leq L_0$$

given $$f = [f_L, f_H] \in \mathcal{F}.$$

To solve this optimization, we examine all candidate branches {b} that satisfy the latency constraint and pick the branches with highest predicted accuracy A(b, f). Note that the latency prediction model $L_0(b, f_L)$ incorporates light-weight features $f_L$ but does not rely on the heavy-weight content features $f_H$. Additionally, both the accuracy prediction model A(b, f) and the latency prediction model $L_0(b, f_L)$ are trained from the data from our offline dataset. The latency constraint accounts for the time to extract the heavy weight features ($S(F_H)$).

Recall that selecting the features used by the scheduler should consider the relative cost and the benefit of including various features. The system may dynamically decides which features to use during runtime, based on current video content characteristics and latency objective (which may also be referred to a latency constraint). The latency constraint may include all or a subset of the terms shown in EQ 4.

Considering switching from branch $b_0$ to b, the switching overhead is the difference between the latency of branch b in its first inference run, and the mean latency of b in the subsequent inference runs. This is estimated offline, as it is static. It depends on the implementation and the nature of execution branches, and varies with size of non-shared data structure such as disjoint parts of a TensorFlow graph. We perform a cost-benefit analysis by including the term $C(b_0, b)$, i.e., the cost of switching in latency (execution time) terms, in the total cost formulation. The data is again collected from the offline training dataset.

Our model of switching cost considers only the current frame. Due to the unforeseen nature of video, we cannot forecast how long a new branch b stays optimal. Thus, the scheduler re-evaluates after every tracking-by-detection GoF. Empirically, this works better than optimizing over a lookahead window by predicting future workload changes. Indeed, the latter approaches are inaccurate and have a high cost. Furthermore, re-evaluating every GoF (typically 4-20 frames) mitigates the impact of an incorrect decision.

Figure 3:
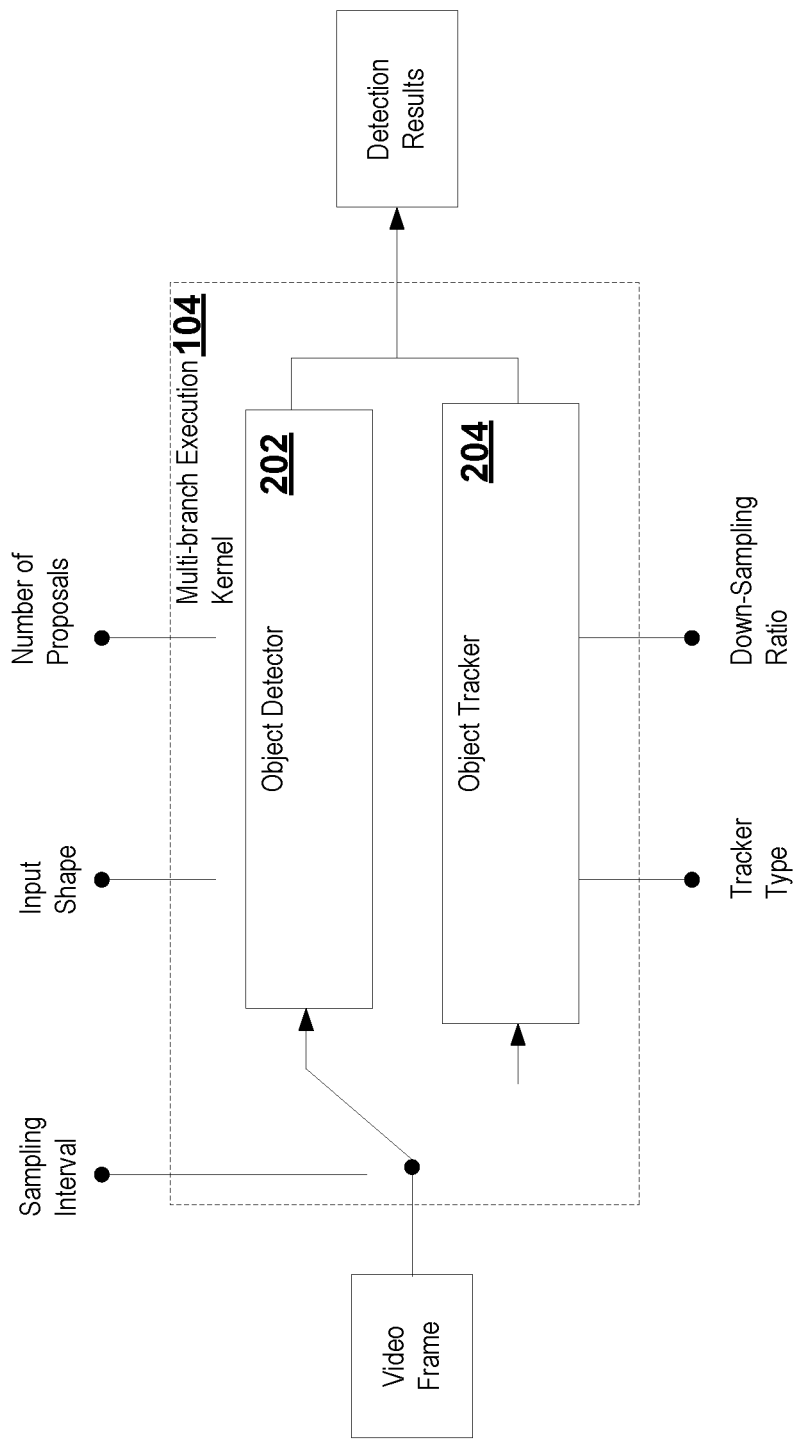
FIG. 3 illustrate an example of a multi-branch execution kernel.

FIG. 3 illustrate an example of a multi-branch execution kernel 104. The multi-branch execution kernel may perform object detection and tracking based on a branch configuration selected by the scheduler (see FIG. 1).

The MBEK 102 may include an object detector 202 and/or an object tracker 204. Embodiments with both object detection and tracking allows for both object tracking and detection. This follows the practice for video object detection that combines the detection and tracking. The MBEK may receive configuration parameters which govern operation of the MBEK and associated object detection and object tracking, whether 2D or 3D. Thus, the configuration parameters may be regarded as tuning parameters which can be modified to adjust performance of object tracking/detection. The system and methods described herein can also be applied to object classification, which is a simpler computer vision task than object detection.

The object detector may include an object detection model. The object detection model may include, for example, a deep neural network (DNN) or some other model known by a person of ordinary skill in the art. Given an input image or video frame, object detector aims at locating tight bounding boxes of object instances from target categories. In terms of network architecture, a CNN-based object detector can be divided into the backbone part that extracts image features, and the detection part that classifies object regions based on the extracted features. The detection part can be further divided into two-stage and single-stage detectors. Two-stage detectors usually make use of Region Proposal Networks (RPN) for generating regions-of-interest (RoIs), which are further refined through the detection head and thus more accurate.

The overwhelming majority of work on light-weight object detection is for images, e.g., YOLOv3 and SSD, thus being agnostic to video characteristics inherent to the temporal relation between image frames. In some preferred examples, the detection DNN may include the Faster-RCNN with ResNet-50 as the backbone. Faster-RCNN is an accurate and flexible framework for object detection and a canonical example of a two-stage object detector. An input image or video frame is first resized to a specific input shape and fed into a DNN, where image features are extracted. Based on the features, a RPN identifies a pre-defined number of candidate object regions, known as region proposals. Image features are further aggregated within the proposed regions, followed by another DNN to classify the proposals into either background or one of target object categories and to refine the location of the proposals. Our key observation is that the input shape and the number of proposals have significant impact to the accuracy and latency. Therefore, we propose to expose input shape and number of region proposals as tuning parameters.

Alternative or in addition, the object detector may perform single-stage object detection. Without using region proposals, these models are optimized for efficiency and oftentimes less flexible. Examples of single stage object detection may include YOLO. Single-stage object detection may simplify object detection as a regression problem by directly predicting bounding boxes and class probabilities without the generation of region proposals.

Object tracking is the other aspect of the multi-branch detector. The object tracker 204 may locate moving objects over time within a video. The object tracker may focus on motion-based visual tracking due to its simplicity and efficiency. In some examples, the object tracker may assume the initial position of each object is given in a starting frame, and makes use of local motion cues to predict the object's position in the next batch of frames.

The object tracker may access one or more object tracking frameworks which perform object tracking with various degrees of accuracy and efficiency with a given set in of input data. The object tracking frameworks 204 may include model(s) and/or logic for performing object tracking. For example, the object tracking frameworks may include a set of existing motion-based object trackers, such as Median-Flow, KCF, CSRT, Dense Optical Flow and/or any other suitable trackers. A key difference behind various object trackers lies in the extraction of motion cues, via e.g., optical flow or correlation filters, leading to varying accuracy and efficiency under different application scenarios. Accordingly, the MBEK may enable the adaptive choice of the trackers as one of the tuning variables described herein.

Another important factor of object tracking performance is the input resolution to a motion-based tracker. A down sampled version of the input image allows improves capturing of large motion and thus tracking fast-moving objects, while a high-resolution input image facilitates the accurate tracking of objects that move slowly. Therefore, the MBEK 102 may receive the down sampling ratio of the input image as another tuning parameter for tracking.

The object detector 202 may perform object detection in a sampling interval while the tracker may track objects between successive frames in the sampling interval. In other words, the object detector may perform computer vision tasks such as object classification, object localization, object detection (in some ways, together these three are within the ambit of object recognition), activity recognition, etc. Essentially, object detection does object classification and then ALSO, in some examples, may define a bounding box around each object of interest in the image and then assigns a class label to each object with a certain probability. Alternatively or in addition, the object detector may perform vanilla object detection and video object detection. An advantage afforded by the system described is that one can leverage the temporal continuity of frames in a group-of-frames (GoF) within a time window in a continuous video and remove redundant steps. For example, some frames may be repetitive and detection may be suspended and, instead, only light-weight tracking may be performed. In fact, this window is something we can learn from the characteristics of the video or may include a fixed window, such as 8 frames. Accordingly, the system may perform compute-intensive object detection for the first frame and object "tracking" (essentially following the detected objects) for the rest of the window (i.e. 7 frames). This is essentially the Sampling interval (si) tuning parameter in our algorithm, also listed in Table 2 below.

Non-liming examples of the tuning parameters described herein include those listed in Table 2, though other parameters are possible. In general tuning parameters of an execution branch configuration affect accuracy and latency of object detection and tracking.

TABLE 2

Tuning Parameter Examples

| Tuning Parameter | Summary Description |
| --- | --- |
| Sampling interval (si) | For every frame, we run the heavy weight object detection DNN on the n frame(s) and light-weight object tracker on the rest of the frames. |
| Input shape (shape) | The resized shape of the video frame that is fed into the detection DNN. |
| Number of proposals (nprop) | The number of proposals generated from the Region Proposal Networks (RPN) in our detection DNN. |
| Tracker type (tracker) | Type or identifier of object tracker. |
| Down-sampling ratio (ds) | The downsampling ratio of the frame used by the object tracker. |

The logic illustrated in the flow diagrams may include additional, different, or fewer operations than illustrated. The operations illustrated may be performed in an order different than illustrated. The system 100 may be implemented with additional, different, or fewer components than illustrated. Each component may include additional, different, or fewer components.

Figure 4:
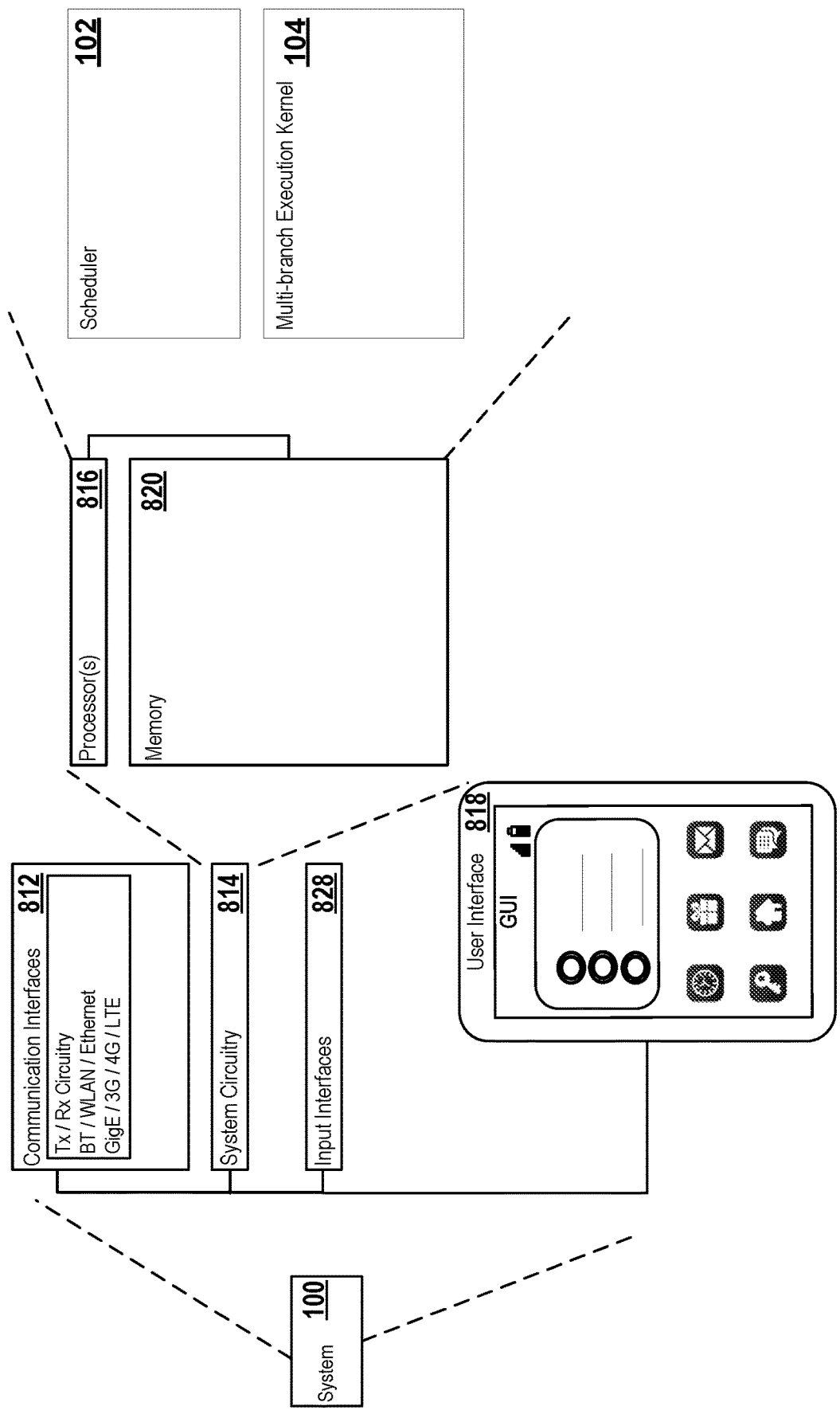
FIG. 4 illustrates a second example of a system.

FIG. 4 illustrates a second example of the system 100. The system 100 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations the scheduler 102, the MBEK 104, and/or the system 100. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include at least one of scheduler 102, the MBEK 104, and/or the system 100. Alternatively or in addition, the memory may include any other component or sub-component of the system 100 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s), and/or processor may communicate instructions to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 100 may be implemented in many different ways. In some examples, the system 100 may be implemented with one or more logical components. For example, the logical components of the system 100 may be hardware or a combination of hardware and software. The logical components may include scheduler 102, the MBEK 104, or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method, comprising:
receiving video information;
selecting a combination of light-weight features and heavy weight features, where the light-weight features are extracted from the video information and the heavy weight features are not yet extracted;

forecasting, based on the light-weight features and the heavy weight features, accuracy and latency metrics for performing object detection and tracking using a plurality of candidate branch configurations, respectively;

selecting a branch configuration from the plurality of candidate branch configurations in response to satisfaction of an optimization criterion; and performing object detection and tracking based on the selected branch configuration.

2. The method of claim 1, wherein the branch configuration comprises a plurality of configuration parameters which affect accuracy and latency of object detection and tracking.

3. The method of claim 1, wherein forecasting, based on the light-weight features and the heavy weight features, accuracy and latency metrics for performing the object detection and tracking using a plurality of candidate branch configurations, respectively further comprises:

calculating, with a first machine learning model, the accuracy metrics based on the light-weight features, the heavy weight features, and the plurality of candidate branch configurations; and calculating, with a second machine learning model, the latency metrics based on the light-weight features, the heavy weight features, and the plurality of candidate branch configurations.

4. The method of claim 1, wherein selecting a branch configuration from the plurality of candidate branch configurations in response to satisfaction of an optimization criterion comprises:

selecting a candidate branch configuration where a corresponding latency metric satisfies a latency constraint and a corresponding accuracy metric is highest.

5. The method of claim 1, wherein selecting a combination of light-weight features and heavy weight features, where the light-weight features are extracted from the video information and the heavy weight features are not yet extracted further comprises:

selecting the heavy weight features where an accuracy contribution of including the heavy weight features with the light-weight features is maximized and a latency contribution of extracting the heavy weight features satisfies a latency constraint.

6. The method of claim 1, wherein selecting a combination of light-weight features and heavy weight features, where the light-weight features are extracted from the video information and the heavy weight features are not yet extracted further comprises:

determining, based on the light-weight features and a candidate branch configuration, a base accuracy value using a machine learning model;

accessing mappings between the heavy weight features and a plurality of modeled performance values, the performances values including modeled accuracy values; and selecting the heavy weight features where a combination of the base accuracy value and corresponding modeled accuracy values is maximized.

7. The method of claim 6, wherein the performance values further include extraction latency values, wherein selecting the heavy weight features where a combination of the base accuracy value and corresponding modeled accuracy values is maximized further comprises:

selecting the heavy weight features where a combination of the base accuracy value and corresponding modeled accuracy values is maximized and where a latency cost of extracting the heavy weight features satisfies a latency constraint.

8. A system, comprising:

a processor, the processor configured to:

receive video information;

select a combination of light-weight features and heavy weight features, where the light-weight features are extracted from the video information and the heavy weight features are not yet extracted;

forecast, based on the light-weight features and the heavy weight features, accuracy and latency metrics for performing object detection and tracking using a plurality of candidate branch configurations, respectively;

select a branch configuration from the plurality of candidate branch configurations in response to satisfaction of an optimization criterion; and perform object detection and tracking based on the selected branch configuration.

9. The system of claim 8, wherein the branch configuration comprises a plurality of configuration parameters which affect accuracy and latency of object detection and tracking.

10. The system of claim 8, wherein to forecast, based on the light-weight features and the heavy weight features, accuracy and latency metrics for performing the object detection and tracking using a plurality of candidate branch configurations, respectively, the processor is further configured to:

calculate, with a first machine learning model, the accuracy metrics based on the light-weight features, the heavy weight features, and the plurality of candidate branch configurations; and calculate, with a second machine learning model, the latency metrics based on the light-weight features, the heavy weight features, and the plurality of candidate branch configurations.

11. The system of claim 8, wherein to select a branch configuration from the plurality of candidate branch configurations in response to satisfaction of an optimization criterion, the processor is configured to:

select a candidate branch configuration where a corresponding latency metric satisfies a latency constraint and a corresponding accuracy metric is highest.

12. The system of claim 8, wherein to select a combination of light-weight features and heavy weight features, where the light-weight features are extracted from the video information and the heavy weight features are not yet extracted, the processor is configured to:

select the heavy weight features where an accuracy contribution of including the heavy weight features with the light-weight features is maximized and a latency contribution of extracting the heavy weight features satisfies a latency constraint.

13. The system of claim 8, wherein to select a combination of light-weight features and heavy weight features, where the light-weight features are extracted from the video information and the heavy weight features are not yet extracted, the processor is configured to:

determine, based on the light-weight features and a candidate branch configuration, a base accuracy value using a machine learning model;

access mappings between the heavy weight features and a plurality of modeled performance values, the performances values including modeled accuracy values; and select the heavy weight features where a combination of the base accuracy value and corresponding modeled accuracy values is maximized.

14. The method system of claim 13, wherein the performance values further include extraction latency values, wherein to select the heavy weight features where a combination of the base accuracy value and corresponding modeled accuracy values is maximized, the processor is configured to:
  select the heavy weight features where a combination of the base accuracy value and corresponding modeled accuracy values is maximized and where a total latency cost of extracting the heavy weight features satisfies a latency constraint.

15. A non-transitory computer readable storage medium, comprising: plurality of instructions executable by a processor to:
  receive video information;
  select a combination of light-weight features and heavy weight features, where the light-weight features are extracted from the video information and the heavy weight features are not yet extracted;
  forecast, based on the light-weight features and the heavy weight features, accuracy and latency metrics for performing object detection and tracking using a plurality of candidate branch configurations, respectively;
  select a branch configuration from the plurality of candidate branch configurations in response to satisfaction of an optimization criterion; and
  perform object detection and tracking based on the selected branch configuration.

16. The non-transitory computer readable storage medium of claim 15, wherein the branch configuration comprises a plurality of configuration parameters which affect accuracy and latency of object detection and tracking.

17. The non-transitory computer readable storage medium of claim 15, wherein to forecast, based on the light-weight features and the heavy weight features, accuracy and latency metrics for performing the object detection and tracking using a plurality of candidate branch configurations, respectively, the instructions are further executable by the processor to:
  calculate, with a first machine learning model, the accuracy metrics based on the light-weight features, the heavy weight features, and the plurality of candidate branch configurations; and
  calculate, with a second machine learning model, the latency metrics based on the light-weight features, the heavy weight features, and the plurality of candidate branch configurations.

18. The non-transitory computer readable storage medium of claim 15, wherein to select a branch configuration from the plurality of candidate branch configurations in response to satisfaction of an optimization criterion, the instructions are further executable by the processor to:
  select a candidate branch configuration where a corresponding latency metric satisfies a latency constraint and a corresponding accuracy metric is highest.

19. The non-transitory computer readable storage medium of claim 15, wherein to select a combination of light-weight features and heavy weight features, where the light-weight features are extracted from the video information and the heavy weight features are not yet extracted, the instructions are further executable by the processor to:
  select the heavy weight features where an accuracy contribution of including the heavy weight features with the light-weight features is maximized and a latency contribution of extracting the heavy weight features satisfies a latency constraint.

20. The non-transitory computer readable storage medium of claim 15, wherein to select a combination of light-weight features and heavy weight features, where the light-weight features are extracted from the video information and the heavy weight features are not yet extracted, the instructions are further executable by the processor to:
  determine, based on the light-weight features and a candidate branch configuration, a base accuracy value using a machine learning model;
  access mappings between the heavy weight features and a plurality of modeled performance values, the performances values including modeled accuracy values; and
  select the heavy weight features where a combination of the base accuracy value and corresponding modeled accuracy values is maximized.

* * * * *